US012596665B2

(12) United States Patent
Sun et al.

(10) Patent No.: US 12,596,665 B2
(45) Date of Patent: Apr. 7, 2026

(54) BUS-BASED TRANSACTION PROCESSING METHOD AND SYSTEM, STORAGE MEDIUM, AND DEVICE

(71) Applicant: SUZHOU METABRAIN INTELLIGENT TECHNOLOGY CO., LTD., Suzhou (CN)

(72) Inventors: Xu Sun, Suzhou (CN); Yulong Zhou, Suzhou (CN); Gang Liu, Suzhou (CN); Tuo Li, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 113 days.

(21) Appl. No.: 18/724,375

(22) PCT Filed: Dec. 23, 2022

(86) PCT No.: PCT/CN2022/141674
§ 371 (c)(1),
(2) Date: Jun. 26, 2024

(87) PCT Pub. No.: WO2024/045438
PCT Pub. Date: Mar. 7, 2024

(65) Prior Publication Data
US 2025/0068578 A1 Feb. 27, 2025

(30) Foreign Application Priority Data
Aug. 31, 2022 (CN) .......................... 202211053563.8

(51) Int. Cl.
*G06F 13/40* (2006.01)
*G06F 13/36* (2006.01)

(52) U.S. Cl.
CPC .......... *G06F 13/4068* (2013.01); *G06F 13/36* (2013.01); *G06F 2213/40* (2013.01)

(58) Field of Classification Search
None
See application file for complete search history.

(56) References Cited

U.S. PATENT DOCUMENTS

| | | | | |
|---|---|---|---|---|
| 7,694,075 | B1 * | 4/2010 | Feekes, Jr. .......... | G06F 12/0897 |
| | | | | 711/119 |
| 9,286,237 | B2 * | 3/2016 | Cai ....................... | G06F 12/122 |

(Continued)

FOREIGN PATENT DOCUMENTS

| | | |
|---|---|---|
| CN | 109167737 A | 1/2019 |
| CN | 113849223 A | 12/2021 |

(Continued)

OTHER PUBLICATIONS

Machine Translation of WIPO Publication WO 2009/131181 A1, published 2009. (Year: 2009).*

(Continued)

*Primary Examiner* — Steven G Snyder
(74) *Attorney, Agent, or Firm* — Merchant & Gould P.C.

(57) ABSTRACT

Provided are a bus-based transaction processing method and system, a storage medium, and a device. The bus-based transaction processing method includes: classifying master devices in a system of a bus according to sensitivity to a time delay, and setting a corresponding initial Quality of Service (QOS) value for each category of master devices, wherein the bus has an outstanding transaction feature; monitoring outstanding transactions of each of the master devices, and computing response time and a predicted cache space utilization rate of the outstanding transactions in a monitoring process; obtaining a new QOS value based on the response time, the predicted cache space utilization rate and the corresponding initial QOS value; and updating the corresponding initial QOS value to the new QOS value, and controlling the bus to perform transaction processing according to the new QOS value. According to the embodi- (Continued)

ments of the present disclosure, the bus having the outstanding transaction feature is dynamically optimized, problems of bus performance degradation and bus deadlock likely to be caused in an architecture having a plurality of master devices and a plurality of buses are solved, the bus is ensured to accurately and efficiently operate, and further reliability of a System On Chip (SOC) is enhanced.

20 Claims, 3 Drawing Sheets

(56) References Cited

U.S. PATENT DOCUMENTS

| | | | | |
|---|---|---|---|---|
| 10,719,452 | B2 * | 7/2020 | Arbel | G06F 12/1027 |
| 10,795,730 | B2 * | 10/2020 | Banerjee | G06F 9/505 |
| 11,321,134 | B2 * | 5/2022 | Banerjee | G06T 1/20 |
| 11,327,899 | B1 * | 5/2022 | Arbel | H03K 19/1776 |
| 11,343,176 | B2 | 5/2022 | Kleyman et al. | |
| 11,593,175 | B2 * | 2/2023 | Banerjee | G06F 9/505 |
| 11,989,587 | B2 | 5/2024 | Illikkal et al. | |
| 2013/0031284 | A1 * | 1/2013 | Yun | G06F 13/364 |
| | | | | 710/105 |
| 2014/0258605 | A1 * | 9/2014 | Cai | G06F 12/122 |
| | | | | 711/136 |
| 2017/0083474 | A1 * | 3/2017 | Meswani | G06F 12/0862 |
| 2019/0391929 | A1 * | 12/2019 | Arbel | G06F 12/1027 |
| 2020/0104180 | A1 * | 4/2020 | Banerjee | G06F 9/3877 |
| 2020/0379815 | A1 * | 12/2020 | Banerjee | G06T 1/20 |
| 2021/0342245 | A1 | 11/2021 | Doddaiah | |
| 2022/0261290 | A1 * | 8/2022 | Banerjee | G06F 9/5038 |
| 2024/0028525 | A1 * | 1/2024 | Sun | G06F 13/4221 |

FOREIGN PATENT DOCUMENTS

| | | | |
|---|---|---|---|
| CN | 113886305 A | 1/2022 | |
| CN | 114072779 A | 2/2022 | |
| CN | 114489463 A | 5/2022 | |
| CN | 114756491 A | 7/2022 | |
| CN | 114911727 A | 8/2022 | |
| CN | 115129645 A | 9/2022 | |
| WO | WO-2019246534 A1 * | 12/2019 | G06F 12/1027 |

OTHER PUBLICATIONS

Machine Translation of Chinese Patent Application CN 117170957 A, published 2023. (Year: 2023).*

Machine Translation of German Patent Application DE 102021203061 A1, published 2022. (Year: 2022).*

'Quality of Service-Aware, Scalable Cache Tuning Algorithm in Consumer-based Embedded Devices' by Alsafrjalani et al., GLSVLSI '16, May 18-20, 2016. (Year: 2016).*

'QoS-aware dynamic resource allocation with improved utilization and energy efficiency on GPU' by Sun et al., Available online Jul. 21, 2022. (Year: 2022).*

Translation of PCT International Search Report mailed on Mar. 17, 2023 for PCT/CN2022/141674 (2 pages).

First Chinese Search Report for Application No. 2022110535638 (2 pages).

Second Chinese Search Report for Application No. 2022110535638 (2 pages).

* cited by examiner

Fig. 3

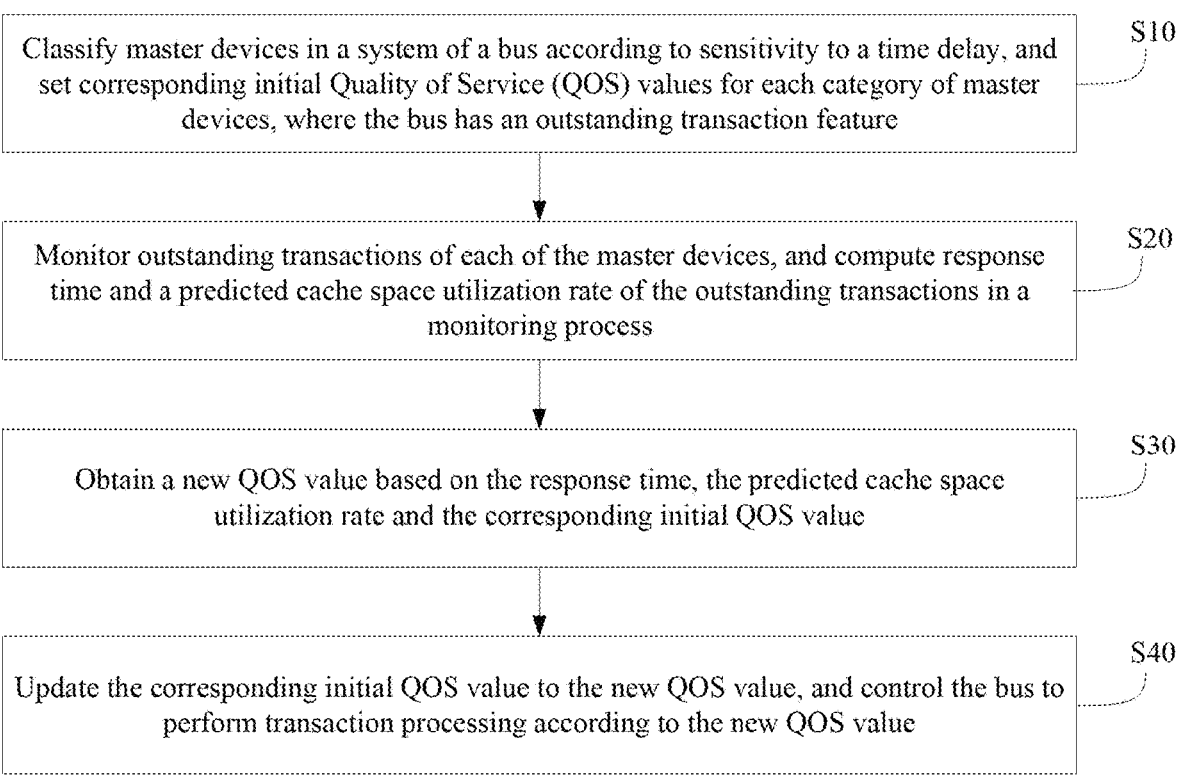

Classify master devices in a system of a bus according to sensitivity to a time delay, and set corresponding initial Quality of Service (QOS) values for each category of master devices, where the bus has an outstanding transaction feature — S10

Monitor outstanding transactions of each of the master devices, and compute response time and a predicted cache space utilization rate of the outstanding transactions in a monitoring process — S20

Obtain a new QOS value based on the response time, the predicted cache space utilization rate and the corresponding initial QOS value — S30

Update the corresponding initial QOS value to the new QOS value, and control the bus to perform transaction processing according to the new QOS value — S40

Fig. 4

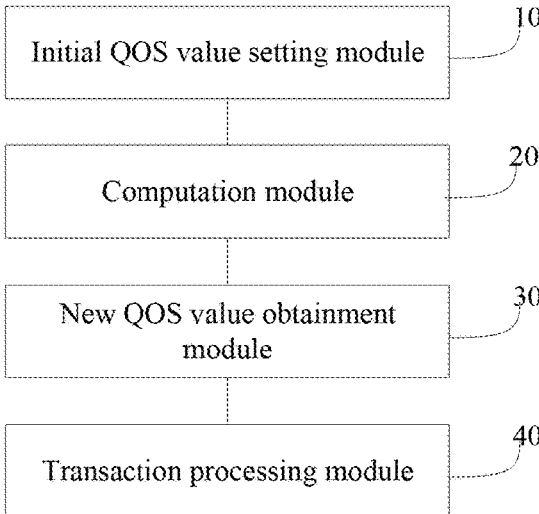

Initial QOS value setting module — 10

Computation module — 20

New QOS value obtainment module — 30

Transaction processing module — 40

Fig. 5

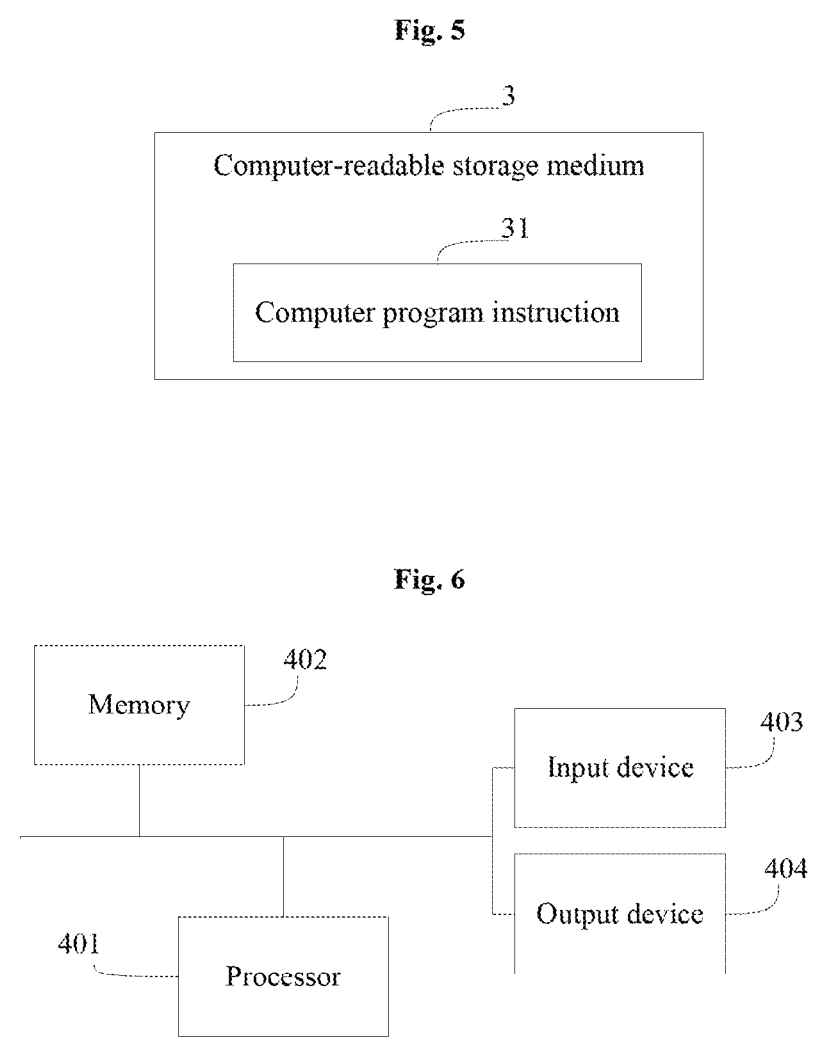

```
                                    3
┌─────────────────────────────────────────┐
│    Computer-readable storage medium       │
│                          31               │
│      ┌─────────────────────────────┐      │
│      │ Computer program instruction │     │
│      └─────────────────────────────┘      │
└─────────────────────────────────────────┘
```

Fig. 6

```
┌──────────────┐ 402
│              │
│   Memory     │              ┌──────────────┐ 403
│              │              │ Input device │
└──────┬───────┘              └──────┬───────┘
       │                             │
───────┴──────────────┬──────────────┤
                      │              ┌┴─────────────┐ 404
401  ┌────────────────┴┐             │ Output device │
     │   Processor     │             └──────────────┘
     └─────────────────┘
```

BUS-BASED TRANSACTION PROCESSING METHOD AND SYSTEM, STORAGE MEDIUM, AND DEVICE

CROSS-REFERENCE TO RELATED APPLICATION

This application is a National Stage Application of International Application No. PCT/CN2022/141674 filed on Dec. 23, 2022, which claims the benefit of Ser. No. 202211053563.8 filed on Aug. 31, 2022 in China, and which applications are incorporated herein by reference. To the extent appropriate, a claim of priority is made to each of the above disclosed applications.

TECHNICAL FIELD

The present disclosure relates to the technical field of buses, and in particular to a bus-based transaction processing method and system, a storage medium, and a device.

BACKGROUND

With the continuous development of integrated circuits, increasing requirements are imposed on a processing speed and performance of a System On Chip (SOC). As a central bridge connecting all modules, a system bus has a vital impact on the performance of the SOC, especially on the performance of the SOC in a system including a plurality of masters (also referred to as master devices) and a plurality of slaves (also referred to as slave devices).

For a bus with an outstanding transaction feature, such as an Advanced eXtensible Interface (AXI) bus, the bus system is composed of basic components including master devices (i.e., Masters), slave devices (i.e., Slaves), and Interconnect, forming a multi-master and multi-slave structure.

Five independent channels are defined in a protocol of the AXI, and handshaking may be carried out for each channel through VALID (indicating data valid) and READY (indicating reception valid) signals. The five channels are respectively an Address Read channel (AR), a Read Data channel (RD), an Address Write channel (AW), a Write Data channel (WD), and a Write Response channel (WR).

The outstanding transaction feature is one of the reasons why the AXI bus is able to achieve high-performance transaction, as the outstanding transaction feature allows the initiation of the next transaction before the current transaction is completed. Therefore, there may be multiple ongoing transactions in the system. If the multiple transactions are able to be processed in parallel by the slave devices, the performance of the system may be improved.

FIG. 1 is a schematic diagram of outstanding transaction. In the scenario without outstanding transaction as shown in FIG. 1 (as shown in the "Without outstanding" part in FIG. 1), a host sends a transaction and waits for a slave device to return data before the host can start the next transaction. Obviously, in the scenario with outstanding transaction as shown in FIG. 1 (as shown in the "With outstanding" part in FIG. 1), the transaction time may be reduced by 33%.

The outstanding transaction of the master device in the system may mask memory access latency and improve memory performance. However, having too many outstanding transactions for the master device is not always beneficial, as when the number of the outstanding transactions for the master device reaches to a certain limit, the memory access performance of other master devices in the system may be severely influenced.

FIG. 2 is a schematic structure diagram of a bus system of an AXI bus. As shown in FIG. 2, the bus system includes 3 AXI buses (AXI Bus 1-3) and 4 master devices (M1-M4), and all of the 4 master devices have transactions accessing the same Double Data Rate (DDR) memory of the slave device. In FIG. 2, mx_trans ($1 \leq x \leq 4$) represents a memory access transaction of each master device, and it is assumed that a priority order of M1, M2, M3 and M4 is M1=M3=M4>M2. When the bus system is applied in a specific application scenario, in a case where there are too many outstanding transactions m2_trans of the master device M2 with low-priority, a queue of transactions m2_trans between M2 and the memory will become longer. However, since the priority of m2_trans is lower than that of m4_trans, m2_trans cannot be processed promptly in an arbitration process of a DDR Controller, and transactions of M1 and M3 are backlogged at their respective ports by the bus for a long time, resulting in severe performance degradation to the master device with high-priority, and even resulting in an error report from the system caused by timeout interrupt.

Therefore, the original bus processing method may no longer handle transaction flows in all cases.

To address this issue, some solutions are provided in the related art, which are briefly described as follows.

In a first solution of the related art, outstanding transactions are not used, or the number of the outstanding transactions is limited within a small range, such as 2 and 3.

In a second solution of the related art, the transaction processing method of the slave devices is modified. For example, cache spaces at the slave-devices are increased, or an arbitration method under multiple transactions is optimized.

However, the above solutions have drawbacks as follows.

In the first solution of the related art, the processing efficiency in a case where most transactions do not conflict with each other may be decreased.

In the second solution of the related art, modifying the processing method of the slave devices will increase the difficulty in designing the slave devices. Moreover, many original slave devices cannot be used directly, which reduced reusability of the slave devices. In addition, if the cache spaces are increased or the arbitration method is optimized, additional resources will be consumed.

SUMMARY

In view of the above, embodiments of the present disclosure provide a bus-based transaction processing method and system, a storage medium, and a device, which may solve the problem of bus performance degradation likely to be caused in an architecture having a plurality of master devices and a plurality of buses.

An aspect of the embodiments of the present disclosure provides a bus-based transaction processing method. The bus-based transaction processing method includes operations as follows:

classifying master devices in a system of a bus according to sensitivity to a time delay, and setting a corresponding initial Quality of Service (QOS) value for each category of master devices, where the bus has an outstanding transaction feature;

monitoring outstanding transactions of each of the master devices, and computing response time and a predicted cache space utilization rate of the outstanding transactions in a monitoring process;

obtaining a new QOS value based on the response time, the predicted cache space utilization rate and the corresponding initial QOS value; and updating the corresponding initial QOS value to the new QOS value, and controlling the bus to perform transaction processing according to the new QOS value.

In some embodiments, the computing a predicted cache space utilization rate of the outstanding transactions in a monitoring process includes:

computing a first numerical value corresponding to transactions sent to the bus, computing a second numerical value corresponding to processed transactions in the transactions sent to the bus, and obtaining a third numerical value corresponding to the outstanding transactions based on a difference between the first numerical value and the second numerical value;

obtaining a cache space utilization rate of the outstanding transactions based on a ratio of the third numerical value to a cache space of the outstanding transactions; and computing a variation gradient of cache space utilization rates based on a plurality of consecutive cache space utilization rates recently recorded, and obtaining the predicted cache space utilization rate based on a cache space utilization rate most recently recorded and the variation gradient.

In some embodiments, the computing a first numerical value corresponding to transactions sent to the bus, and computing a second numerical value corresponding to processed transactions in the transactions sent to the bus includes:

accumulating, in response to determining that the transactions sent to the bus are write operation transactions, a number of corresponding write operation instructions and data length values corresponding to the write operation instructions so as to obtain the first numerical value; and accumulating a number of corresponding write response instructions and data length values corresponding to the write response instructions so as to obtain the second numerical value.

In some embodiments, the computing a first numerical value corresponding to transactions sent to the bus, and computing a second numerical value corresponding to processed transactions in the transactions sent to the bus includes:

accumulating, in response to determining that the transactions sent to the bus are read operation transactions, a number of corresponding read operation instructions so as to obtain the first numerical value; and accumulating a number of corresponding read response instructions so as to obtain the second numerical value.

In some embodiments, the computing response time of the outstanding transactions in a monitoring process includes:

computing, in response to determining that the outstanding transactions are outstanding write operation transactions, a time period between time when a write operation instruction is sent by a corresponding master device and time when a write response instruction is received by the corresponding master device, and determining the computed time period as the response time.

In some embodiments, the computing response time of the outstanding transactions in a monitoring process further includes:

computing, in response to determining that the outstanding transactions are outstanding read operation transactions, a time period between time when a read operation instruction is sent by a corresponding master device and time when a read response instruction is received by the corresponding master device, and determining the computed time period as the response time.

In some embodiments, the obtaining a new QOS value based on the response time, the predicted cache space utilization rate and the corresponding initial QOS value includes:

determining a threshold range in which the predicted cache space utilization rate is located, and configuring a corresponding first adjustment factor according to the threshold range;

determining whether the response time goes beyond a preset timeout time, and configuring a corresponding second adjustment factor based on a determination result; and obtaining the new QOS value based on the corresponding initial QOS value, the corresponding first adjustment factor and the corresponding second adjustment factor.

In some embodiments, the determining a threshold range in which the predicted cache space utilization rate is located, and configuring a corresponding first adjustment factor according to the threshold range includes:

determining the threshold range in which the predicted cache space utilization rate is located;

configuring the first adjustment factor as a first preset value in response to determining that the predicted cache space utilization rate is less than a first threshold;

configuring the first adjustment factor as a second preset value in response to determining that the predicted cache space utilization rate is greater than or equal to the first threshold and less than or equal to a second threshold; and configuring the first adjustment factor as a third preset value in response to determining that the predicted cache space utilization rate is greater than the second threshold and less than a third threshold.

The first preset value is smaller than the second preset value, and the second preset value is smaller than the third preset value.

In some embodiments, the determining whether the response time goes beyond a preset timeout time, and configuring a corresponding second adjustment factor based on a determination result includes:

determining whether the response time goes beyond the preset timeout time;

configuring the second adjustment factor as the third preset value in response to determining that the response time goes beyond the preset timeout time; and configuring the second adjustment factor as the first preset value in response to determining that the response time does not go beyond the preset timeout time.

In some embodiments, the obtaining the new QOS value based on the corresponding initial QOS value, the corresponding first adjustment factor and the corresponding second adjustment factor includes:

obtaining a pre-adjustment QOS value based on the corresponding initial QOS value, the corresponding first adjustment factor and the corresponding second adjustment factor;

determining whether the pre-adjustment QOS value exceeds a maximum QOS value;

determining the pre-adjustment QOS value as the new QOS value in response to determining that the pre-adjustment QOS value does not exceed the maximum QOS value; or determining the maximum QOS value as the new QOS value in response to determining that the pre-adjustment QOS value exceeds the maximum QOS value.

In some embodiments, the obtaining a pre-adjustment QOS value based on the corresponding initial QOS value, the corresponding first adjustment factor and the corresponding second adjustment factor includes:

adding the corresponding initial QOS value, the corresponding first adjustment factor and the corresponding second adjustment factor so as to obtain the pre-adjustment QOS value.

In some embodiments, the classifying master devices in a system of a bus according to sensitivity to a time delay, and setting a corresponding initial QOS value for each category of master devices includes:

classifying, according to the sensitivity to the time delay, the master devices in the system of the bus into a high-delay master device, a high-bandwidth real-time master device and a low-delay master device; and setting QOS value ranges corresponding to the high-delay master device, the high-bandwidth real-time master device and the low-delay master device to increase sequentially.

Another aspect of the embodiments of the present disclosure provides a bus-based transaction processing system. The bus-based transaction processing system includes:

an initial QOS value setting module, which is configured to classify master devices in a system of a bus according to sensitivity to a time delay, and set a corresponding initial QOS value for each category of master devices, where the bus has an outstanding transaction feature;

a computation module, which is configured to monitor outstanding transactions of each of the master devices, and compute response time and a predicted cache space utilization rate of the outstanding transactions in a monitoring process;

a new QOS value obtainment module, which is configured to obtain a new QOS value based on the response time, the predicted cache space utilization rate and the corresponding initial QOS value; and a transaction processing module, which is configured to update the corresponding initial QOS value to the new QOS value, and control the bus to perform transaction processing according to the new QOS value.

Yet another aspect of the embodiments of the present disclosure provides a non-volatile computer-readable storage medium. The non-volatile computer-readable storage medium stores a computer program instruction. The computer program instruction, when executed by a processor, causes the processor to implement the above method.

Still another aspect of the embodiments of the present disclosure provides a computer device. The computer device includes a memory and a processor. The memory stores a computer program. The processor is configured to run the computer program to execute the above method.

The embodiments of the present disclosure at least have beneficial effects as follows.

According to the embodiments of the present disclosure, the bus having the outstanding transaction feature is dynamically optimized. By classifying the master devices according to the sensitivity to the time delay, presetting the initial QOS value, monitoring a change in the outstanding transactions and dynamically adjusting the QOS value, problems of bus performance degradation and bus deadlock likely to be caused in an architecture having a plurality of master devices and a plurality of buses are solved, the bus is ensured to accurately and efficiently operate, and further reliability, applicability and operation performance of a System On Chip (SOC) are enhanced.

BRIEF DESCRIPTION OF THE DRAWINGS

In order to describe the technical solutions in the embodiments of the present disclosure or in the related art more clearly, accompanying drawings required to be used in the descriptions of the embodiments or the related art will be briefly introduced below. Apparently, the accompanying drawings in the following descriptions are merely some embodiments of the present disclosure. Those having ordinary skill in the art may also derive other embodiments according to these accompanying drawings without making creative efforts.

FIG. 3 is a schematic diagram of a bus-based transaction processing method according to the embodiments of the present disclosure;

FIG. 4 is a schematic diagram of a bus-based transaction processing system according to the embodiments of the present disclosure;

FIG. 5 is a schematic diagram of a non-volatile computer-readable storage medium for implementing a bus-based transaction processing method according to the embodiments of the present disclosure; and FIG. 6 is a schematic diagram of a hardware structure of a computer device for executing a bus-based transaction processing method according to the embodiments of the present disclosure.

DETAILED DESCRIPTION OF THE EMBODIMENTS

Figure 1:
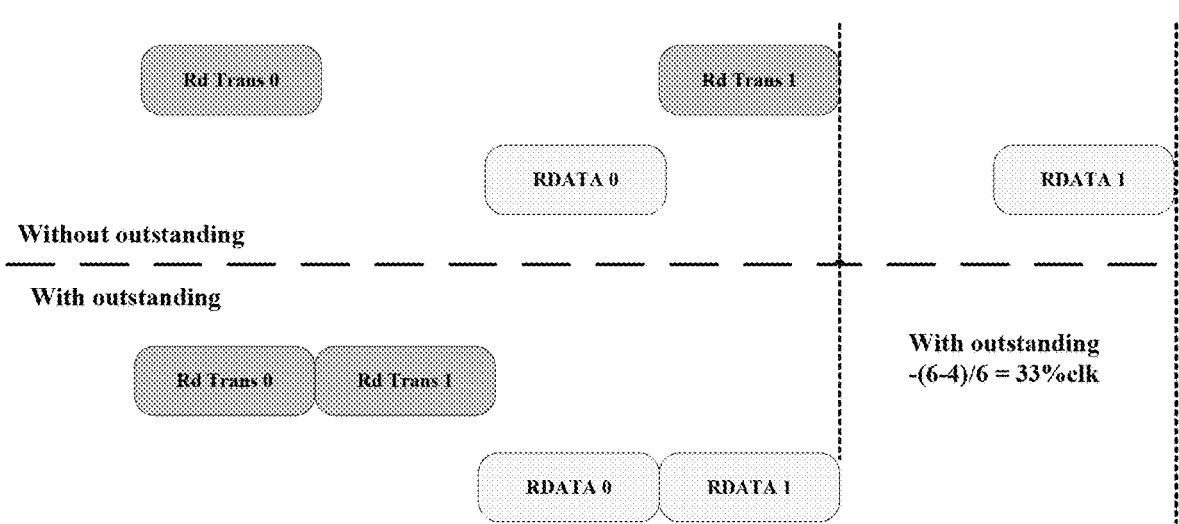
FIG. 1 is a schematic structural diagram of outstanding read transactions according to the related art.
Figure 2:
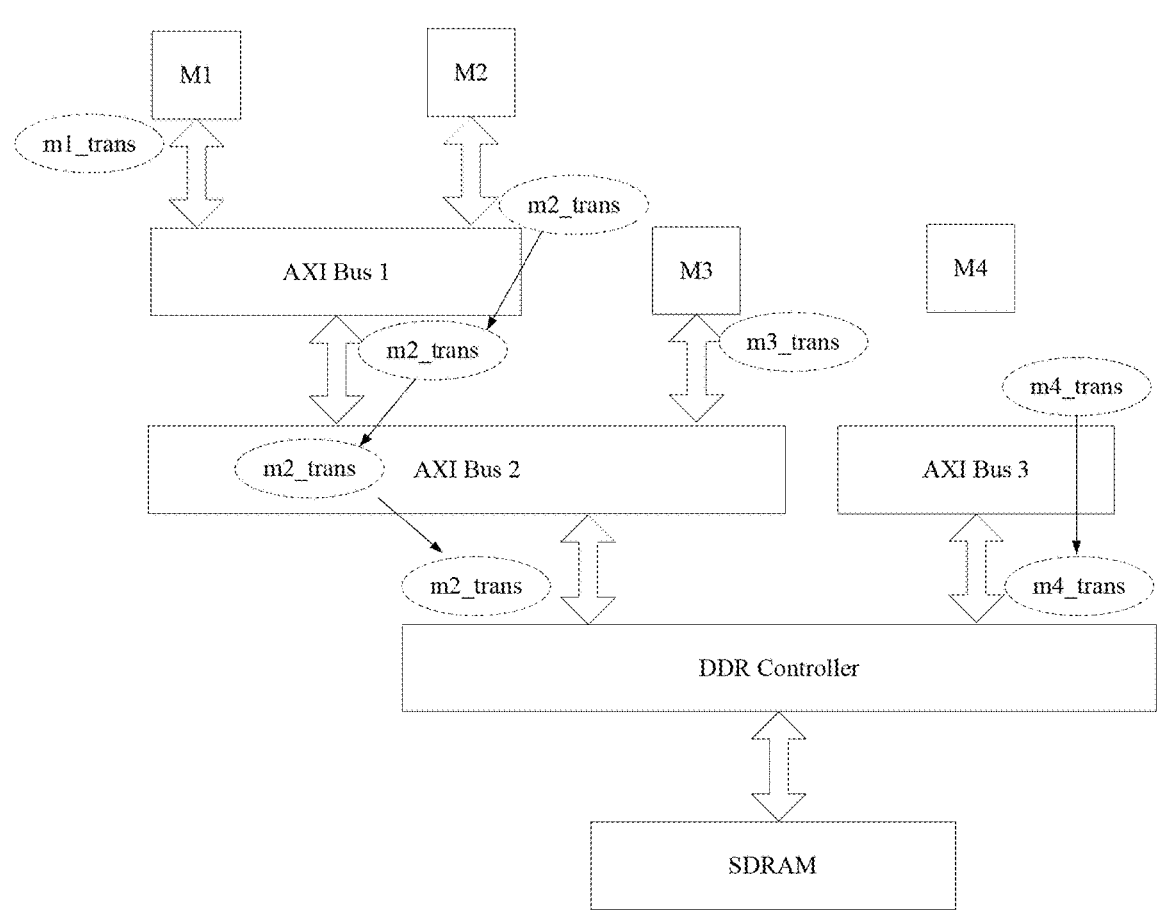
FIG. 2 is a schematic structural diagram of an Advanced Extensible Interface (AXI) bus system according to the related art.

In order to make the objective, technical solutions and advantages of the present disclosure clearer, the embodiments of the present disclosure will be further described in detail below in combination with particular embodiments and with reference to accompanying drawings.

It should be noted that all expressions with "first" and "second" in the embodiments of the present disclosure are used to distinguish two different entities or parameters having the same name. It may be seen that "first" and "second" are merely for convenience of expression, and should not be construed as limitations on the embodiments of the present disclosure. In addition, the terms "comprise", "include" and "have" as well as their variations are intended to cover non-exclusive inclusion, such as other operations or units inherent in a process, method, system, product or device including a series of operations or units.

A first aspect of the embodiments of the present disclosure provides an embodiment of a bus-based transaction processing method. A schematic diagram of a bus-based transaction processing method according to the embodiments of the present disclosure is shown in FIG. 3. As shown in FIG. 3, the bus-based transaction processing method provided in some embodiments of the present disclosure includes operations S10 to S40 which are described in detail as follows.

In operation S10, master devices in a system of a bus are classified according to sensitivity to a time delay, and a corresponding initial Quality of Service (QOS) value is set for each category of master devices. The bus has an outstanding transaction feature.

In operation S20, outstanding transactions of each of the master devices are monitored, and response time and a predicted cache space utilization rate of the outstanding transactions are computed in a monitoring process.

In operation S30, a new QOS value is obtained based on the response time, the predicted cache space utilization rate and the corresponding initial QOS value.

In operation S40, the corresponding initial QOS value is updated to the new QOS value, and the bus is controlled to perform transaction processing according to the new QOS value.

In the embodiments of the present disclosure, the bus may be an Advanced Extensible Interface (AXI) bus having an outstanding transaction feature.

With the AXI bus as an example, an AXI protocol supports Quality of Service (QOS) signals, including write operation AWQOS and read operation ARQOS, which are all 4-bit signals. No specific usage of the write operation AWQOS and the read operation ARQOS is specified in the protocol, and it is just suggested that an AxQOS signal (AWQOS or ARQOS) is used for discriminating priority. The greater the QOS value, the higher the priority.

According to the embodiments of the present disclosure, the bus having the outstanding transaction feature is dynamically optimized. By classifying the master devices according to the sensitivity to the time delay, presetting the initial QOS value, monitoring a change in the outstanding transactions and dynamically adjusting the QOS value, problems of bus performance degradation and bus deadlock likely to be caused in an architecture having a plurality of master devices and a plurality of buses are solved, the bus is ensured to accurately and efficiently operate, and further reliability, applicability and operation performance of a System On Chip (SOC) are enhanced.

In some embodiments, the operations of classifying master devices in a system of a bus according to sensitivity to a time delay, and setting a corresponding initial QOS value for each category of master devices include: classifying, according to the sensitivity to the time delay, the master devices in the system of the bus into a high-delay master device, a high-bandwidth real-time master device and a low-delay master device; and setting QOS value ranges corresponding to the high-delay master device, the high-bandwidth real-time master device and the low-delay master device to increase sequentially.

In the embodiments, the master devices are classified into the following 3 categories according to functions and use requirements of the master devices.

a. Low-Delay (Delay-Sensitive) Master Devices:

In the System On Chip (SOC) system, such devices are extremely sensitive to an operational delay and are required to complete operations as rapidly as possible, but do not have too high overall requirements on bandwidths. For example, a Central Processing Unit (CPU) does not have high requirements on bandwidths, but a single-threaded operation of the CPU is directly related to a delay of accessing data. Thus, the CPU is extremely sensitive to a time delay and is a typical low-delay master device.

b. High-Delay (Delay-Insensitive) Master Devices:

Such devices are not sensitive to a delay of an operation. Generally, a data reading speed of such devices is low, and a data reading and writing sequence result of such devices will not affect a data processing flow of a high-speed device. An Inter-Integrated Circuit (IIC), a Serial Peripheral Interface (SPI), and a controller of a Universal Asynchronous Receiver/Transmitter (UART) protocol are typical high-delay master devices.

c. High-Bandwidth Real-Time Master Devices:

Such master devices generally have high bandwidth transmission and high real-time performance requirements. Devices related to image processing, such as image acquisition and reception, image transmission and display, and image processing or encoding are typical high-bandwidth real-time master devices.

Read and write processes (read and write channels) of the AXI bus are completely independent of each other, that is, the read and write processes will not affect each other. Thus, write operation AWQOS and read operation ARQOS need to be set. The setting methods for the read and write processes are the same at a presetting stage.

When the QOS is used on the bus, 4 bits are generally used. That is, the QOS ranges from 0 to 15. The greater the value, the higher the priority. Certainly, more or fewer bits may be used during usage, but the setting methods are the same. With 4 bits as an example, a value range of different devices is as follows: a value range of the high-delay (delay-insensitive) master devices is 0-3; a value range of the high-bandwidth real-time master devices is 4-11; and a value range of the low-delay (delay-sensitive) master devices is 12-15.

In addition, preset QOS values for the same category of devices may also be different. That is, different priorities may be preset for the same category of devices.

In some embodiments, the operation of computing a predicted cache space utilization rate of the outstanding transactions in a monitoring process includes: computing a first numerical value corresponding to transactions sent to the bus, computing a second numerical value corresponding to processed transactions in the transactions sent to the bus, and obtaining a third numerical value corresponding to the outstanding transactions based on a difference between the first numerical value and the second numerical value; obtaining a cache space utilization rate of the outstanding transactions based on a ratio of the third value to a cache space of the outstanding transactions; and computing a variation gradient of cache space utilization rates based on a plurality of consecutive cache space utilization rates recently recorded, and obtaining the predicted cache space utilization rate based on a cache space utilization rate most recently recorded and the variation gradient.

In some embodiments, the operations of computing a first numerical value corresponding to transactions sent to the bus, and computing a second numerical value corresponding to processed transactions in the transactions sent to the bus include: accumulating, in response to determining that the transactions sent to the bus are write operation transactions, a number of corresponding write operation instructions and data length values corresponding to the write operation instructions so as to obtain the first numerical value; and accumulating a number of corresponding write response instructions and data length values corresponding to the write response instructions so as to obtain the second numerical value.

In some embodiments, the operations of computing a first numerical value corresponding to transactions sent to the bus, and computing a second numerical value corresponding to processed transactions in the transactions sent to the bus include: accumulating, in response to determining that the transactions sent to the bus are read operation transactions, a number of corresponding read operation instructions so as to obtain the first numerical value; and accumulating a number of corresponding read response instructions so as to obtain the second numerical value.

In some embodiments, the operation of computing response time of the outstanding transactions in a monitoring process includes: computing, in response to determining that the outstanding transactions are outstanding write operation transactions, a time period between time when a write operation instruction is sent by a corresponding master device and time when a write response instruction is received by the corresponding master device, and determining the computed time period as the response time.

In some embodiments, the operation of computing response time of the outstanding transactions in a monitoring process further includes: computing, in response to determining that the outstanding transactions are outstanding read operation transactions, a time period between time when a read operation instruction is sent by a corresponding master device and time when a read response instruction is received by the corresponding master device, and determining the computed time period as the response time.

In the above embodiments, in the monitoring process of the outstanding transaction, the following computations are mainly carried out.

a. Computation of Outstanding Transactions:

First, transactions sent to the bus are computed. In a case of a write operation, when an axi_awvalid (write instruction sending) signal is 1 and an axi_awready (write instruction receiving) signal is 1, data lengths are accumulated, and a write operation sending count is wr_t_cnt and may be calculated according to the following formula:

$$wr\_t\_cnt = wr\_t\_cnt + awlen + 1.$$

In a case of a read operation, when an axi_arvalid (read instruction sending) signal is 1 and an axi_arready (read instruction receiving) signal is 1, a read operation sending count rd_t_cnt is incremented by 1:

$$rd\_t\_cnt = rd\_t\_cnt + 1.$$

Essentially, outstanding transactions of read operations are computed based on the number of transactions corresponding to the read operations. No matter how much data needs to be read in response to an instruction, one time is counted. By contrast, the write transactions are computed based on the specific length of write data. This difference is resulted by the fact that the read operations and the write operations are differently processed in middle interconnect part of the bus.

Next, the completed transactions are computed. In a case of a write operation, when an axi_bvalid (write response sending) signal is 1 and an axi_bready (write response receiving) signal is 1, it is indicated that a write transaction is completed. At this time, the data lengths are accumulated, and the completed write operation count is wr_r_cnt and may be calculated according to the following formula:

$$wr\_r\_cnt = wr\_r\_cnt + awlen\_reg + 1.$$

Specifically, awlen_reg is a cache value of the write data length, that is, a data length of the current write operation.

In a case of the read operation, when an axi_rvalid (read response sending) signal, an axi_rready (read response receiving) signal, and an axi_rlast signal are all 1, 1 is added, and the completed read operation count is rd_r_cnt:

$$rd\_r\_cnt = rd\_r\_cnt + 1.$$

Finally, the outstanding transactions are computed as follows:

$$wr\_out\_cnt = wr\_t\_cnt - wr\_r\_cnt; \quad and$$
$$rd\_out\_cnt = rd\_t\_cnt - rd\_r\_cnt.$$

b. Computation of Response Time of Outstanding Transactions:

Write outstanding transaction response time is Wr_out_time. When the axi_awvalid signal is 1 and the axi_awready signal is 1, Wrout_time starts to be counted and accumulated. When the axi_bvalid signal is 1 and the axi_bready signal is 1, it is indicated that a write transaction is completed. At this time, Wr_out_time is cleared to zero and counting stops.

Read outstanding transaction response time is rd_out_time. When an axi_arvalid signal is 1 and an axi_arready signal is 1, rd_out_time starts to be counted and accumulated. When an axi_rvalid signal is 1 and an axi_rready signal is 1, it is indicated that a read transaction is completed. At this time, rd_out_time is cleared and counting stops.

c. Computation of Cache Space Utilization Rate of Outstanding Transactions:

A cache space utilization rate of the write outstanding transactions is wr_rat-wr_out_cnt/wr_mem, where wr_mem is a cache space of the write outstanding transactions in an interconnect part of the bus, and includes cache for write instructions and write data.

A cache space utilization rate of the read outstanding transactions is rd_rat=rd_out_cnt/rd_mem, where rd_mem is a cache space of the read outstanding transactions in an interconnect part of the bus, and includes only cache for read instructions.

d. Variation Gradient of Cache Space Utilization Rates of Outstanding Transactions A variation gradient of cache space utilization rates of the outstanding transactions is computed. Assuming that results of recent 3 monitoring records are wr_rat_1, wr_rat_2, wr_rat_3, rd_rat_1, rd_rat_2 and rd_rat_3 (time interval Th of each recording may be defined and adjusted according to a clock frequency, a bus category, etc.), where _1 represents the most recent monitoring record, that is, the latest record. The variation gradient of the cache space utilization rates of the read/write outstanding transactions is as follows:

$$Gred\_wr\_rat = (wr\_rat\_1 - wr\_rat\_2 + wr\_rat\_2 - wr\_rat\_3)/(2 * T_h)$$

$$Gred\_rd\_rat = (rd\_rat\_1 - rd\_rat\_2 + rd\_rat\_2 - rd\_rat\_3)/(2 * T_h)$$

e. Computation of Predicted Cache Space Utilization Rate of Outstanding Transactions:

$$Pred\_wr\_rat = wr\_rat\_1 + Gred\_wr\_rat * 0.5 * T_a$$

$$Pred\_rd\_rat = rd\_rat\_1 + Gred\_rd\_rat * 0.5 * T_a$$

In some embodiments, the operation of obtaining a new QOS value based on the response time, the predicted cache space utilization rate and the corresponding initial QOS value includes: determining a threshold range in which the predicted cache space utilization rate is located, and configuring a corresponding first adjustment factor according to the threshold range; determining whether the response time goes beyond a preset timeout time, and configuring a corresponding second adjustment factor based on a determination result; and obtaining the new QOS value based on the corresponding initial QOS value, the corresponding first adjustment factor and the corresponding second adjustment factor.

In some embodiments, the operations of determining a threshold range in which the predicted cache space utilization rate is located, and configuring a corresponding first adjustment factor according to the threshold range include: determining the threshold range in which the predicted cache space utilization rate is located; configuring the first adjustment factor as a first preset value in response to determining that the predicted cache space utilization rate is less than a first threshold; configuring the first adjustment factor as a second preset value in response to determining that the predicted cache space utilization rate is greater than or equal to the first threshold and less than or equal to a second threshold; and configuring the first adjustment factor as a third preset value in response to determining that the predicted cache space utilization rate is greater than the second threshold and less than a third threshold. The first preset value is smaller than the second preset value, and the second preset value is smaller than the third preset value.

In some embodiments, the operations of determining whether the response time goes beyond a preset timeout time, and configuring a corresponding second adjustment factor based on a determination result include: determining whether the response time goes beyond the preset timeout time; configuring the second adjustment factor as the third preset value in response to determining that the response time goes beyond the preset timeout time; and configuring the second adjustment factor as the first preset value in response to determining that the response time does not go beyond the preset timeout time.

In some embodiments, the operation of obtaining the new QOS value based on the corresponding initial QOS value, the corresponding first adjustment factor and the corresponding second adjustment factor includes: obtaining a pre-adjustment QOS value based on the corresponding initial QOS value, the corresponding first adjustment factor and the corresponding second adjustment factor; determining whether the pre-adjustment QOS value exceeds a maximum QOS value; determining the pre-adjustment QOS value as the new QOS value in response to determining that the pre-adjustment QOS value does not exceed the maximum QOS value; or determining the maximum QOS value as the new QOS value in response to determining that the pre-adjustment QOS value exceeds the maximum QOS value.

In some embodiments, the operation of obtaining a pre-adjustment QOS value based on the corresponding initial QOS value, the corresponding first adjustment factor and the corresponding second adjustment factor includes: adding the corresponding initial QOS value, the corresponding first adjustment factor and the corresponding second adjustment factor so as to obtain the pre-adjustment QOS value.

In the above embodiment, the operation of dynamically adjusting the QOS value specifically includes operations as follows (processing methods in the case of the read operation and in the case of the write operation are the same and will not be separately introduced).

a. Compute an adjustment factor ad_factor_1 (a first adjustment factor), where Pred_rat represents Pred_wr_ rat and Pred_rd_rat;

$TH_3$, $TH_2$ and $TH_1$ respectively represent a third threshold, a second threshold and a first threshold, and are all values determined according to experience.

In a case where $TH_3$>Pred_rat outstanding transaction predicted value>$TH_2$, ad_factor_1=2 (the third preset value).

In a case where $TH_2$≥Pred_rat outstanding transaction predicted value≥$TH_1$, ad_factor_1=1 (the second preset value).

In a case where $TH_1$>Pred_rat outstanding transaction predicted value, ad_factor_1=0) (the first preset value).

b. Compute adjustment factor ad_factor_2 (a second adjustment factor), where out_time represents rd_out_ time and wr_out_time.

In a case where outstanding transaction response time out_time>T_timeout*0.8 (preset timeout time), ad_factor_2=2; and otherwise, ad_factor_2=0.

c. Compute a pre-adjustment result.

The pre-adjustment result QOS_temp=QOS_pre+ad_factor_1+ad_factor_2, where

QOS_pre is a QOS value before adjustment, that is, an initial QOS value.

d. Compute a new QOS value.

In a case where QOS_temp>QOS_max, QOS=QOS_max, where

QOS_max is a maximum, which is 15 under a bit width of 4 bits; otherwise,

QOS=QOS_temp.

A second aspect of the embodiments of the present disclosure further provides a bus-based transaction processing system. A schematic diagram of a bus-based transaction processing system according to the embodiments of the present disclosure is shown in FIG. 4. As shown in FIG. 4, the bus-based transaction processing system includes: an initial QOS value setting module 10, which is configured to classify master devices in a system of a bus according to sensitivity to a time delay, and set a corresponding initial QOS value for each category of master devices, where the bus has an outstanding transaction feature; a computation module 20, which is configured to monitor outstanding transactions of each of the master devices, and compute response time and a predicted cache space utilization rate of the outstanding transactions in a monitoring process; a new QOS value obtainment module 30, which is configured to obtain a new QOS value based on the response time, the predicted cache space utilization rate and the corresponding initial QOS value; and a transaction processing module 40, which is configured to update the corresponding initial QOS value to the new QOS value, and control the bus to perform transaction processing according to the new QOS value.

A third aspect of the embodiments of the present disclosure further provides a non-volatile computer-readable storage medium. A schematic diagram of a non-volatile computer-readable storage medium for implementing a bus-based transaction processing method according to an embodiment of the present disclosure is shown in FIG. 5. As shown in FIG. 5, the non-volatile computer-readable storage medium 3 stores a computer program instruction 31. The computer program instruction 31, when executed by a processor, causes the processor to implement the bus-based transaction processing method in any one of the above embodiments.

It should be understood that without conflict with one another, all above embodiments, features and advantages illustrated for the bus-based transaction processing method according to the embodiments of the present disclosure is also applicable to the bus-based transaction processing system and the non-volatile computer-readable storage medium according to the embodiments of the present disclosure.

A fourth aspect of the embodiments of the present disclosure further provides a computer device. The computer device includes a memory 402 and a processor 401 as shown in FIG. 6. The memory 402 stores a computer program. The processor 401 is configured to run the computer program to implement the bus-based transaction processing method in any one of the above methods.

A schematic diagram of a hardware structure of a computer device for executing a bus-based transaction processing method according to the embodiments of the present disclosure is shown in FIG. 6. With the computer device as shown in FIG. 6 as an example, the computer device includes a processor 401 and a memory 402, and may further include an input device 403 and an output device 404. The processor 401, the memory 402, the input device 403 and the output device 404 may be connected by a bus or through other methods. In FIG. 6, a bus connection is taken as an example. The input device 403 may receive input numerical or character information, and generate key signal input related to user settings and function control of the bus-based transaction processing system. The output device 404 may include a display device such as a display screen.

The memory 402, as a non-volatile computer-readable storage medium, may be configured to store a non-volatile software program, a non-volatile computer-executable program and a module, such as a program instruction/module corresponding to the bus-based transaction processing method in the embodiments of the present disclosure. The memory 402 may include a storage program region and a storage data region. The storage program region may store an operating system, an application required for at least one function. The storage data region may store data created for usage of a bus-based transaction processing method, etc. In addition, the memory 402 may include a high-speed random access memory, and may further include a non-volatile memory, such as at least one disk storage device, a flash memory device, or other non-volatile solid-state storage devices. In some embodiments, the memory 402 optionally includes memories remotely arranged relative to a processor 401. These remote memories may be connected to local modules over networks. Examples of the above networks include but are not limited to the internet, an enterprise intranet, a local area network, a mobile communication network and their combinations.

The processor 401 executes various functional applications and data processing of a server by running non-volatile software programs, instructions and modules stored in the memory 402, that is, implements the bus-based transaction processing method in the above method embodiment.

Finally, it should be noted that the non-volatile computer-readable storage medium (such as a memory) herein may be a volatile memory or a non-volatile memory, or may include both the volatile memory and the non-volatile memory. As examples and not limitations, the non-volatile memory may include a Read-Only Memory (ROM), a Programmable ROM (PROM), an Electrically Programmable ROM (EPROM), an Electrically Erasable Programmable ROM (EEPROM), or a flash memory. The volatile memory may include a random access memory (RAM), and the RAM may act as an external high-speed cache memory. As examples and not limitations, the RAM may be obtained in a plurality of forms, such as a Synchronous RAM (SRAM), a Dynamic RAM (DRAM), a synchronous DRAM (SDRAM), a Double Data Rate SDRAM (DDR SDRAM), an enhanced SDRAM (ESDRAM), a Synchronous Link DRAM (SLDRAM), and a direct Rambus RAM (DRRAM). The memory devices in the disclosed aspects are intended to include but are not limited to these and other suitable types of memories.

Those skilled in the art will further understand that various illustrative logical blocks, modules, circuits and algorithm operations described in combination with the present disclosure herein may be implemented as electronic hardware, computer software or their combination. In order to clearly illustrate such interchangeability between the hardware and software, functions of various illustrative assemblies, blocks, modules, circuits and operations are described generally. Whether such functions are implemented as software or hardware depends on particular applications and design constraints applied to the entire system. Those skilled in the art may implement functions in various ways for each particular application, but such implementation decisions should not be interpreted as causing a departure from the scope disclosed by some embodiments of the present disclosure.

The above embodiments are exemplary embodiments disclosed in the present disclosure. However, it should be noted that various changes and modifications may be made without departing from the scope disclosed by the embodiments of the present disclosure as defined in the claims. Functions, operations and/or actions of method claims according to the disclosed embodiments described herein are not required to be executed in any particular order. In addition, although elements disclosed in the embodiments of the present disclosure may be described or required in an individual form, the elements may also be construed as in a plural form unless explicitly limited to be in a singular form.

It should be understood that as used herein, the singular forms "a" and "an" are also intended to include a plural form, unless the context clearly supports exceptions. It should also be understood that "and/or" as used herein is meant to include any and all possible combinations of one or more associatively listed items. The above example sequence numbers disclosed by the embodiments of the present disclosure are merely used for description, and do not indicate advantages and disadvantages of the embodiments.

Those having ordinary skill in the art should understand that the discussion of any above embodiment is merely illustrative, and is not intended to imply that the scope (including the claims) disclosed by the embodiments of the present disclosure is limited to these embodiments. According to ideas of the embodiments of the present disclosure, technical features in the above embodiments or different embodiments may also be combined with each other, and there are many other variations of different aspects of the embodiments of the present disclosure as described above, which are not provided in detail for the sake of brevity. Therefore, any omission, modification, equivalent substitution, improvement, etc. made within the principles of the embodiments of the present disclosure should fall within the scope of protection of the embodiments of the present disclosure.

What is claimed is:

1. A bus-based transaction processing method, comprising:

classifying master devices in a system of a bus according to sensitivity to a time delay, and setting a corresponding initial Quality of Service (QOS) value for each category of master devices, wherein the bus has an outstanding transaction feature;

monitoring outstanding transactions of each of the master devices, and computing response time and a predicted cache space utilization rate of the outstanding transactions in a monitoring process;

obtaining a new QOS value based on the response time, the predicted cache space utilization rate and the corresponding initial QOS value; and updating the corresponding initial QOS value to the new QOS value, and controlling the bus to perform transaction processing according to the new QOS value.

2. The bus-based transaction processing method according to claim 1, wherein the computing a predicted cache space utilization rate of the outstanding transactions in a monitoring process comprises:

computing a first numerical value corresponding to transactions sent to the bus, computing a second numerical value corresponding to processed transactions in the transactions sent to the bus, and obtaining a third numerical value corresponding to the outstanding transactions based on a difference between the first numerical value and the second numerical value;

obtaining a cache space utilization rate of the outstanding transactions based on a ratio of the third numerical value to a cache space of the outstanding transactions; and computing a variation gradient of cache space utilization rates based on a plurality of consecutive cache space utilization rates recently recorded, and obtaining the predicted cache space utilization rate based on a cache space utilization rate most recently recorded and the variation gradient.

3. The bus-based transaction processing method according to claim 2, wherein the computing a first numerical value corresponding to transactions sent to the bus, and computing a second numerical value corresponding to processed transactions in the transactions sent to the bus comprises:

accumulating, in response to determining that the transactions sent to the bus are write operation transactions, a number of corresponding write operation instructions and data length values corresponding to the write operation instructions so as to obtain the first numerical value; and accumulating a number of corresponding write response instructions and data length values corresponding to the write response instructions so as to obtain the second numerical value.

4. The bus-based transaction processing method according to claim 2, wherein the computing a first numerical value corresponding to transactions sent to the bus, and computing a second numerical value corresponding to processed transactions in the transactions sent to the bus comprises:

accumulating, in response to determining that the transactions sent to the bus are read operation transactions, a number of corresponding read operation instructions so as to obtain the first numerical value; and accumulating a number of corresponding read response instructions so as to obtain the second numerical value.

5. The bus-based transaction processing method according to claim 1, wherein the computing response time of the outstanding transactions in a monitoring process comprises:

computing, in response to determining that the outstanding transactions are outstanding write operation transactions, a time period between time when a write operation instruction is sent by a corresponding master device and time when a write response instruction is received by the corresponding master device, and determining the computed time period as the response time.

6. The bus-based transaction processing method according to claim 1, wherein the computing response time of the outstanding transactions in a monitoring process comprises:

computing, in response to determining that the outstanding transactions are outstanding read operation transactions, a time period between time when a read operation instruction is sent by a corresponding master device and time when a read response instruction is received by the corresponding master device, and determining the computed time period as the response time.

7. The bus-based transaction processing method according to claim 1, wherein the obtaining a new QOS value based on the response time, the predicted cache space utilization rate and the corresponding initial QOS value comprises:

determining a threshold range in which the predicted cache space utilization rate is located, and configuring a corresponding first adjustment factor according to the threshold range;

determining whether the response time goes beyond a preset timeout time, and configuring a corresponding second adjustment factor based on a determination result; and obtaining the new QOS value based on the corresponding initial QOS value, the corresponding first adjustment factor and the corresponding second adjustment factor.

8. The bus-based transaction processing method according to claim 7, wherein the determining a threshold range in which the predicted cache space utilization rate is located, and configuring a corresponding first adjustment factor according to the threshold range comprises:

determining the threshold range in which the predicted cache space utilization rate is located;

configuring the first adjustment factor as a first preset value in response to determining that the predicted cache space utilization rate is less than a first threshold;

configuring the first adjustment factor as a second preset value in response to determining that the predicted cache space utilization rate is greater than or equal to the first threshold and less than or equal to a second threshold; and configuring the first adjustment factor as a third preset value in response to determining that the predicted cache space utilization rate is greater than the second threshold and less than a third threshold;

wherein the first preset value is smaller than the second preset value, and the second preset value is smaller than the third preset value.

9. The bus-based transaction processing method according to claim 8, wherein the determining whether the response time goes beyond a preset timeout time, and configuring a corresponding second adjustment factor based on a determination result comprises:

determining whether the response time goes beyond the preset timeout time;

configuring the second adjustment factor as the third preset value in response to determining that the response time goes beyond the preset timeout time; and configuring the second adjustment factor as the first preset value in response to determining that the response time does not go beyond the preset timeout time.

10. The bus-based transaction processing method according to claim 7, wherein the obtaining the new QOS value based on the corresponding initial QOS value, the corresponding first adjustment factor and the corresponding second adjustment factor comprises:

obtaining a pre-adjustment QOS value based on the corresponding initial QOS value, the corresponding first adjustment factor and the corresponding second adjustment factor;

determining whether the pre-adjustment QOS value exceeds a maximum QOS value;

determining the pre-adjustment QOS value as the new QOS value in response to determining that the pre-adjustment QOS value does not exceed the maximum QOS value; or determining the maximum QOS value as the new QOS value in response to determining that the pre-adjustment QOS value exceeds the maximum QOS value.

11. The bus-based transaction processing method according to claim 10, wherein the obtaining a pre-adjustment QOS value based on the corresponding initial QOS value, the corresponding first adjustment factor and the corresponding second adjustment factor comprises:

adding the corresponding initial QOS value, the corresponding first adjustment factor and the corresponding second adjustment factor so as to obtain the pre-adjustment QOS value.

12. The bus-based transaction processing method according to claim 1, wherein the classifying master devices in a system of a bus according to sensitivity to a time delay, and setting a corresponding initial QOS value for each category of master devices comprises:

classifying, according to the sensitivity to the time delay, the master devices in the system of the bus into a high-delay master device, a high-bandwidth real-time master device and a low-delay master device; and setting QOS value ranges corresponding to the high-delay master device, the high-bandwidth real-time master device and the low-delay master device to increase sequentially.

13. The bus-based transaction processing method according to claim 1, wherein the setting a corresponding initial QOS value for each category of master devices comprises:

setting a corresponding initial write operation QOS value and a corresponding read operation QOS value for each category of master devices.

14. The bus-based transaction processing method according to claim 12, wherein the high-bandwidth real-time master device comprises an image acquisition and reception device, an image transmission and display device, an image processing device, and an encoding device.

15. The bus-based transaction processing method according to claim 12, wherein the high-delay master device comprises an inter-integrated circuit, a serial peripheral interface, and a controller of a universal asynchronous receiver/transmitter protocol.

16. The bus-based transaction processing method according to claim 1, wherein the QOS value indicates priority of the master device, and the QOS value is in a direct proportion to the priority of the master device.

17. The bus-based transaction processing method according to claim 16, further comprising:

setting different initial QOS values for the same category of master devices, such that the same category of master devices correspond to different priorities.

18. A non-volatile computer-readable storage medium, storing a computer program instruction, wherein the computer program instruction, when executed by a processor, causes the processor to implement the following operations:

classifying master devices in a system of a bus according to sensitivity to a time delay, and setting a corresponding initial Quality of Service (QOS) value for each category of master devices, wherein the bus has an outstanding transaction feature;

monitoring outstanding transactions of each of the master devices, and computing response time and a predicted cache space utilization rate of the outstanding transactions in a monitoring process;

obtaining a new QOS value based on the response time, the predicted cache space utilization rate and the corresponding initial QOS value; and updating the corresponding initial QOS value to the new QOS value, and controlling the bus to perform transaction processing according to the new QOS value.

19. A computer device, comprising a memory and a processor, wherein the memory stores a computer program, and the processor is configured to run the computer program to execute the following operations:

classifying master devices in a system of a bus according to sensitivity to a time delay, and setting a corresponding initial Quality of Service (QOS) value for each category of master devices, wherein the bus has an outstanding transaction feature;

monitoring outstanding transactions of each of the master devices, and computing response time and a predicted cache space utilization rate of the outstanding transactions in a monitoring process;

obtaining a new QOS value based on the response time, the predicted cache space utilization rate and the corresponding initial QOS value; and updating the corresponding initial QOS value to the new QOS value, and controlling the bus to perform transaction processing according to the new QOS value.

20. The bus-based transaction processing method according to claim 2, wherein a time interval between the plurality of consecutive cache space utilization rates is defined and adjusted according to a clock frequency and a bus category of the bus.

* * * * *